United States Patent Office 3,288,242
Patented Nov. 29, 1966

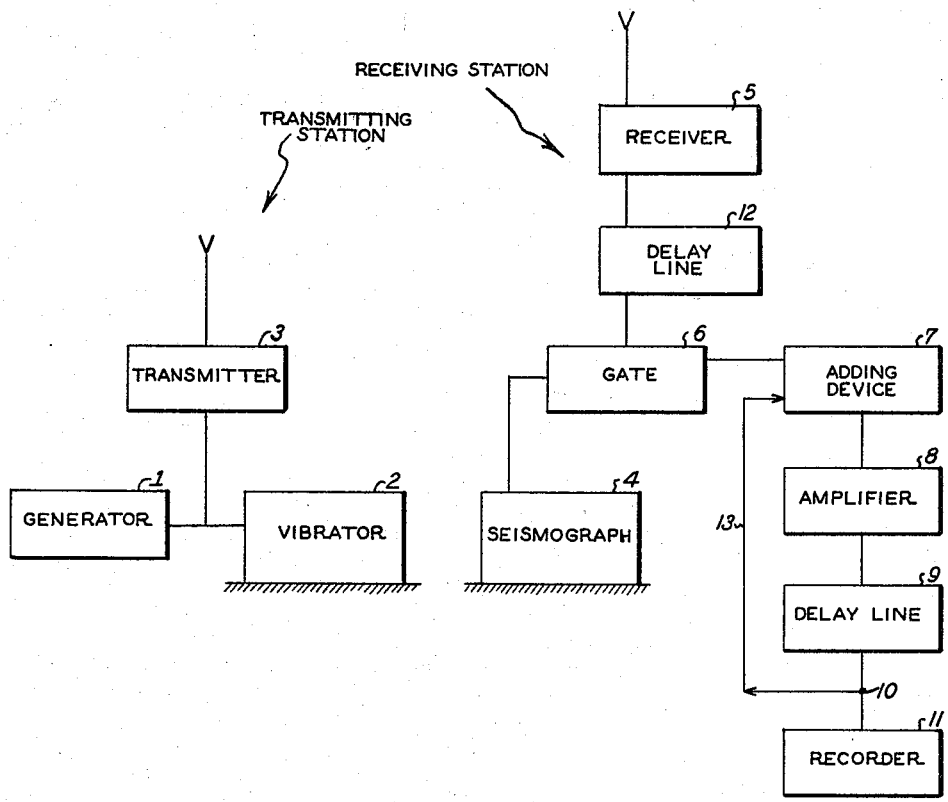

3,288,242
ELECTROMAGNETIC WAVE CONTROLLED
GATED SEISMIC WAVE RECORDER
Julien M. Loeb, Saint-Cloud, France, assignor of fifty percent to Compagnie Generale de Geophysique, and fifty percent to Institut Francais du Petrole des Carburants et Lubrifiants, Paris, France and Rueil-Malmaison, France, respectively
Filed Oct. 29, 1962, Ser. No. 233,749
Claims priority, application France, Nov. 7, 1961, 878,133
2 Claims. (Cl. 181—.5)

This invention pertains to seismic prospecting and more particularly to pulsed vibrating wave generators.

It is a well-known fact that the conventional methods of seismic prospecting consist in burying a charge of explosive at a predetermined point and locating hand geophones or seismographs at some distance from the predetermined point.

The explosion of the charge produces seismic waves which deeply penetrate the ground and are reflected by surfaces of discontinuity in the ground reflected. The seismic waves are collected by seismographs so that the records obtained by the latter can be read to locate the surfaces of discontinuity.

The prior methods theoretically had the advantage of forming in a single operation a picture of the whole system of surfaces of discontinuity in the region in which the prospecting operations were being executed, by means of a single explosion.

In contradistinction, the data obtained are often somewhat inaccurate and unreliable and they do not provide in all cases, an accurate picture of the actual discontinuity found at certain depths.

The present invention has for its object a different method of seismic prospecting. The method is limited purposely, from the outset, to the study of discontinuities which may exist at a predetermined depth. The limitation shows as a counterpart the advantage of providing to a much more precise exploration, and providing more detailed data for a predetermined portion of the subsurface.

Briefly, the invention contemplates that, at a transmitting station for producing the seismic waves, there be instead of the conventional charge of explosive, a generator adapted to emit at uniform time intervals, wave trains which are damped as they pass through the ground, and at the receiving station, a seismograph which feeds an amplifier through a gate which remains open only during a very short time period, approximately equal to the duration of the damped wave trains produced at the transmitting station. The gate opens only after a time $\theta$ following the production of a wave train. The time $\theta$ is selected to be equal to the time duration of the forward and return travel of the seismic waves down to the surface of discontinuity which it is desired to investigate. The amplifier feeds a delay line whose output is feedback to the input of the amplifier so as to produce a cumulative effect on the waves transmitted by the seismograph while the gate is allowed to remain open.

The invention will now be described in further detail and other features will be disclosed with reference being made to the sole figure of the accompanying drawing which illustrates an embodiment of the invention.

At the transmiting station, a generator 1 of electric pulses energizes a vibrator 2 of any suitable type which transforms these electric pulses into movements of a member connected with the ground so as to generate and produce seismic waves in the latter.

The vibrator may be advantageously of the type described in my U.S. application Ser. No. 849,887 filed October 30, 1959, now Patent No. 3,122,664.

The generator 1 is designed so as to produce pulses, that is damped wave trains, repeated in a uniform manner. The time $t$ elapsing between two successive pulses is adjustable and ranges, for instance, between 100 milliseconds and 2 seconds. The duration $d$ of the pulses produced is of the order of 10 milliseconds.

Furthermore, the pulses supplied by the generator 1 serve for modulating a wireless transmitter 3.

At the receiving station, the seismic waves produced in the ground by the vibrator 2 are received by a seismograph or geophone 4.

A wireless receiver 5 receives furthermore the waves sent out by the wireless transmitter 3 and detects them, so that the output of said receiver 5 supplies a pulse forming a replica of that produced at the output of the generator 1.

The pulse at the output of the receiver 5 is fed to delay line 12 which delays it by an amount $\theta$, which is adjustable and selected so as to be equal to the duration of the travel of the seismic waves to the surface of discontinuity to be defined and back.

The pulse thus delayed serves for opening a gate 6 inserted at the output of the seismograph 4.

The gate 6 remains open for a predetermined duration which may be adjusted. The duration is of the magnitude of the duration $d$ of the pulse produced by the generator 1, but it may be for a shorter time to allow for a narrower analysis of the underground subsurface.

The signal from the output of the seismograph 4 is fed, when the gate 6 is open, to one input of an adding device 7 the second input of the adding device 7 receives signals from a feedback lead 13 as will hereinafter become apparent. The sum of the signals is amplified by an amplifier 8 whose output is connected to a delay line 9. Delay line 9 introduces an adjustable delay of a duration $t$ in the summed signals, which is equal to the time elapsing between two successive pulses produced by the generator 1.

The output of the delay line 9 is connected to a recording device 11 and also via the connecting point 10 to feedback lead 13 connected to the second input of the adding device 7.

The operation of the system will now be described: The vibrator 2 transmits into the ground seismic wave trains which are uniformly spaced in time. The seismograph 4 receives the reflected waves and transmits signals via gate 6 to the adding device 7. Only those portions of the signals which should be are transmitted by seismograph 4 when gate 6 is open are received by adding device 7. Gate 6 is open only for the short periods during which the waves produced by the surface of discontinuity to be examined are expected to arrive, the depth of said surface being defined by the adjustment provided for the delay line 12.

The duration of the delay introduced by the delay line 9 is selected so as to be equal, as mentioned, to the time elapsed $t$ between two pulses produced by the generator 1. Consequently it is apparent that the feedback pulse fed by the lead 13 to the input of the adding device 7 registers in time with the pulse corresponding to the next train of seismic waves produced by the generator 1. This leads, as a matter of fact, to an accumulation of signal amplitude at the output of delay line 9 which increases, as a function of the number of pulses received by the seismograph 4. On the other hand the pulses produced by surfaces of discontinuity at other depths cannot interfere in this case since the corresponding pulses transmitted by the seismograph 4 will occur when the gate 6 is in its closed condition.

By reason of this cumulative effect, the amplitude of the signal across the output terminals of the delay line 9 increases proportionally with the number N of wave trains produced by the generator 1 whereas the parasitic noise increases, as is well-known proportionally with $\sqrt{N}$, see the publication "Random Processes in Automatic Control" by Laning and Baltin, McGraw Hill 1956 pp. 67–73 wherein on page 69 it is shown that the sum of a random variable increases proportionately with $\sqrt{N}$. There is accordingly a considerable improvement in the ratio between signal and noise.

It will be noted that it is of interest to operate with two series of experiments by modifying the value of $t$ which is the time elapsing between two pulses produced by the generator 1. This is necessary in order to remove the influence of a surface of discontinuity located at a depth such that the delay corresponding to the waves reflected by such a surface is equal to $t+\theta$ or $2t+\theta$ or more generally to $mt+\theta$ $m$ being an integer. As a matter of fact, a wave train which has been subjected to this delay ($mt+\theta$) will reach the seismograph when the gate 6 is open.

It will be noted that the wireless connection between the transmitter 3 and the receiver 5 may be replaced, if required, by a wired connection feeding directly the pulses obtained from the generator 1 into the input of the delay line 12, possibly after a suitable attenuation.

It is generally preferred to give $t$, a value slightly greater than to $\theta$; it is possible though to take for $t$, the value $\theta$.

The delay lines used may be of any conventional type. By reason of the substantial delay which it is to provide, the line 9 may be constituted by a magnetic drum turning at a uniform speed and carrying a strip of ferrite. The output of the amplifier 8 is then connected with a recording head and the output of the delay line 9 is connected with a reading head provided beyond the recording head in the direction of rotation of the drum, at a location such that the desired delay is obtained.

It is also possible to resort to a delay line incorporating active elements, for instance transistors, so as to produce substantial delays by means of elements such as capacitances and inductances of standard sizes.

What I claim is:

1. A system for seismically prospecting underground strata, comprising a transmitting station including means for simultaneously producing a series of seismic wave trains and of electromagnetic wave trains of a short duration at predetermined adjustable time intervals; and a receiving station including means adapted to receive the seismic wave trains reflected by the underground strata and to transform them into the electromagnetic pulses, means for receiving the electromagnetic waves; means for delaying the electromagnetic waves thus received by an adjustable amount equal to the time required for the seismic waves to impinge on and be reflected by strata at a predetermined depth and to reach the receiving station, a gate opened by the delayed electromagnetic waves during the passage thereof including an input for receiving said electromagnetic pulses and an output for transmitting the received electromagnetic pulses, and recording means adapted to receive the electromagnetic pulses transmitted by the output of said gate.

2. An arrangement for seismically prospecting underground strata, comprising: a transmitting station including means for simultaneously producing a series of seismic wave trains and of electromagnetic wave trains of a short duration at predetermined adjustable time intervals; and a receiving station including means adapted to receive the seismic wave trains reflected by the underground strata and to transform them into electromagnetic pulses, means for receiving the electromagnetic waves, means for delaying the electromagnetic waves thus received by an amount equal to the time required for the seismic waves to impinge on and to be reflected by strata at a predetermined depth, and to reach the receiving station, a gate opened by the delayed electromagnetic waves during the passage thereof, said gate including an input for receiving said electromagnetic pulses and an output for transmitting the received electromagnetic pulses, adding means including a first input connected to the output of said gate, a second input and an output, an amplifier including an input connected to the output of said adding means and an output, a further delay means including an input connected to the output of said amplifier and an output, a feed-back circuit connecting the output of said further delay means to the second input of said adding means, and recording means connected to the output of said further delay means, said further delay means being operative to delay the signal received from said amplifier by an amount equal to the time intervals between said wave pulses whereby a signal is fed to the adding means for addition with the next signal to be received thereby.

No references cited.

SAMUEL FEINBERG, *Primary Examiner.*

CHESTER L. JUSTUS, BENJAMIN A. BORCHELT,
*Examiners.*

T. H. TUBBESING, M. F. HUBLER,
*Assistant Examiners.*